J. ANSTICE.
COMBINED BREAD CUTTER AND STACKER.
APPLICATION FILED OCT. 14, 1919.

1,341,452.

Patented May 25, 1920.
5 SHEETS—SHEET 3.

Inventor
Josiah Anstice,
A. S. Pattison
By
Attorney

J. ANSTICE.
COMBINED BREAD CUTTER AND STACKER.
APPLICATION FILED OCT. 14, 1919.

1,341,452.

Patented May 25, 1920.
5 SHEETS—SHEET 4.

Inventor
Josiah Anstice,
A. S. Pattison
By
Attorney

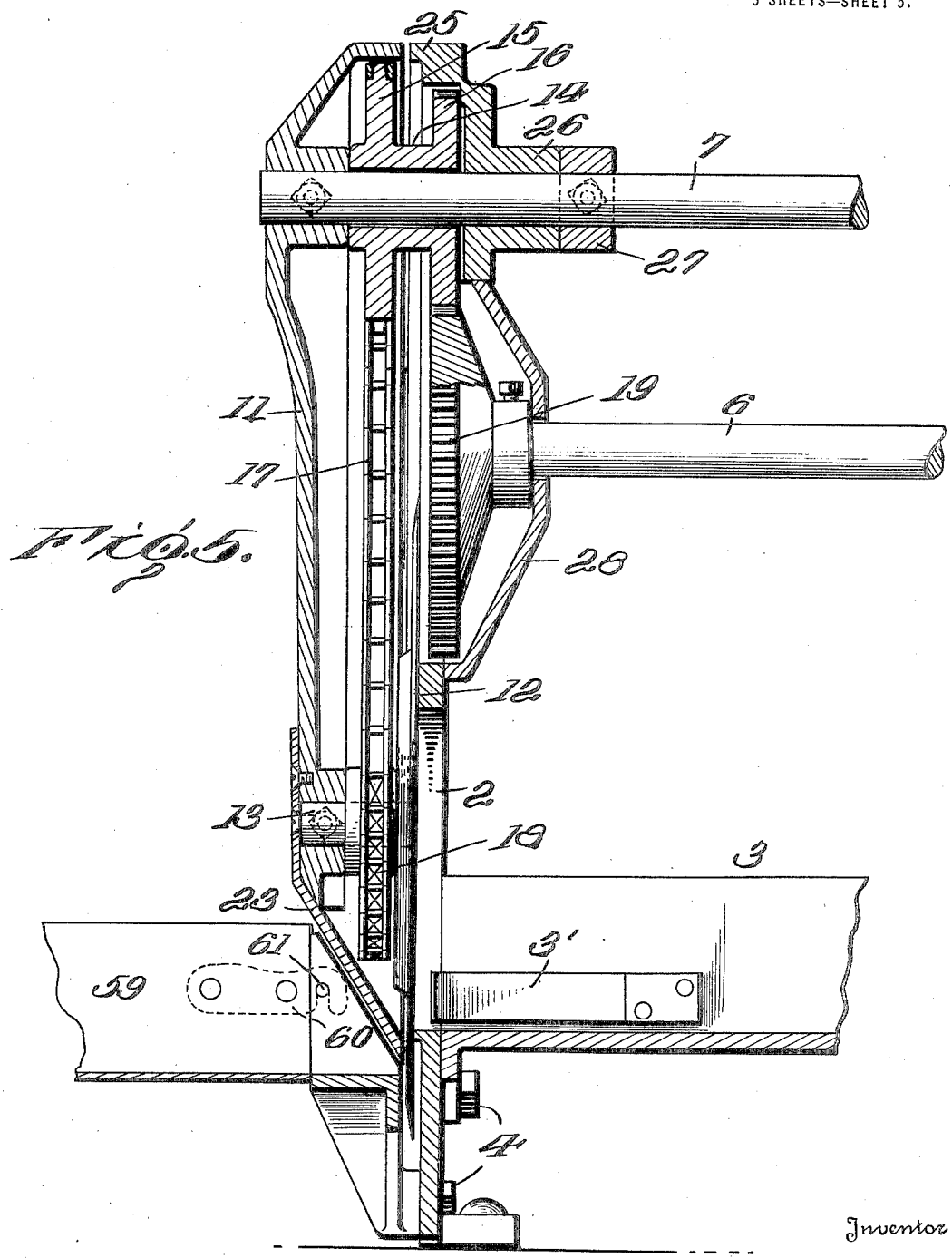

UNITED STATES PATENT OFFICE.

JOSIAH ANSTICE, OF ROCHESTER, NEW YORK, ASSIGNOR TO JOSIAH ANSTICE & CO., INC., OF ROCHESTER, NEW YORK, A CORPORATION OF NEW YORK.

COMBINED BREAD CUTTER AND STACKER.

1,341,452.        Specification of Letters Patent.       Patented May 25, 1920.

Application filed October 14, 1919. Serial No. 330,602.

*To all whom it may concern:*

Be it known that I, JOSIAH ANSTICE, a citizen of the United States, residing at Rochester, in the county of Monroe and State of New York, have invented certain new and useful Improvements in Combined Bread Cutters and Stackers, of which the following is a specification, reference being had therein to the accompanying drawing.

My invention relates to improvements in combined bread cutters and stackers, and is more particularly intended for use in hotels, restaurants and other places where large quantities of sliced bread is required.

The primary objects of my invention are certain improvements upon that type of bread slicer and stacker in which there is a rotating knife in the form of a disk which has also a reciprocating movement across the line of travel of the bread to be cut, and means for feeding the bread forward predetermined varied distances for the purpose of cutting any desired thickness of slices.

One of my present improvements is to provide a continuously rotating drive shaft for revolving the cutter blade and a rock shaft to which one end of the blade carrying frame is attached, the rock shaft actuated by the drive shaft, whereby the cutter blade is continuously rotated as it is moved back and forth across the line of travel of the bread to be cut.

Further objects of my present invention comprise the manner of rotatably connecting the drive shaft with the combined reciprocating and rotating blade by means of a gear that is loosely placed upon the rock shaft, and in turn is operatively connected with the cutter blade.

A further object of my present invention pertains to the details of construction located between the rotating shaft and the means for feeding the bread forward step by step to be cut into slices.

Further objects of my present invention will appear from the details of construction hereinafter pointed out and defined in the appended claims.

In the accompanying drawings—

Fig. 5 is a vertical central sectional view taken transversely through the reciprocating bread carrying frame, and showing some of its coöperating adjacent parts.

Fig. 6 is a top plan view of a part of the bread-carrying trough showing the bread pusher therein.

Figure 1:
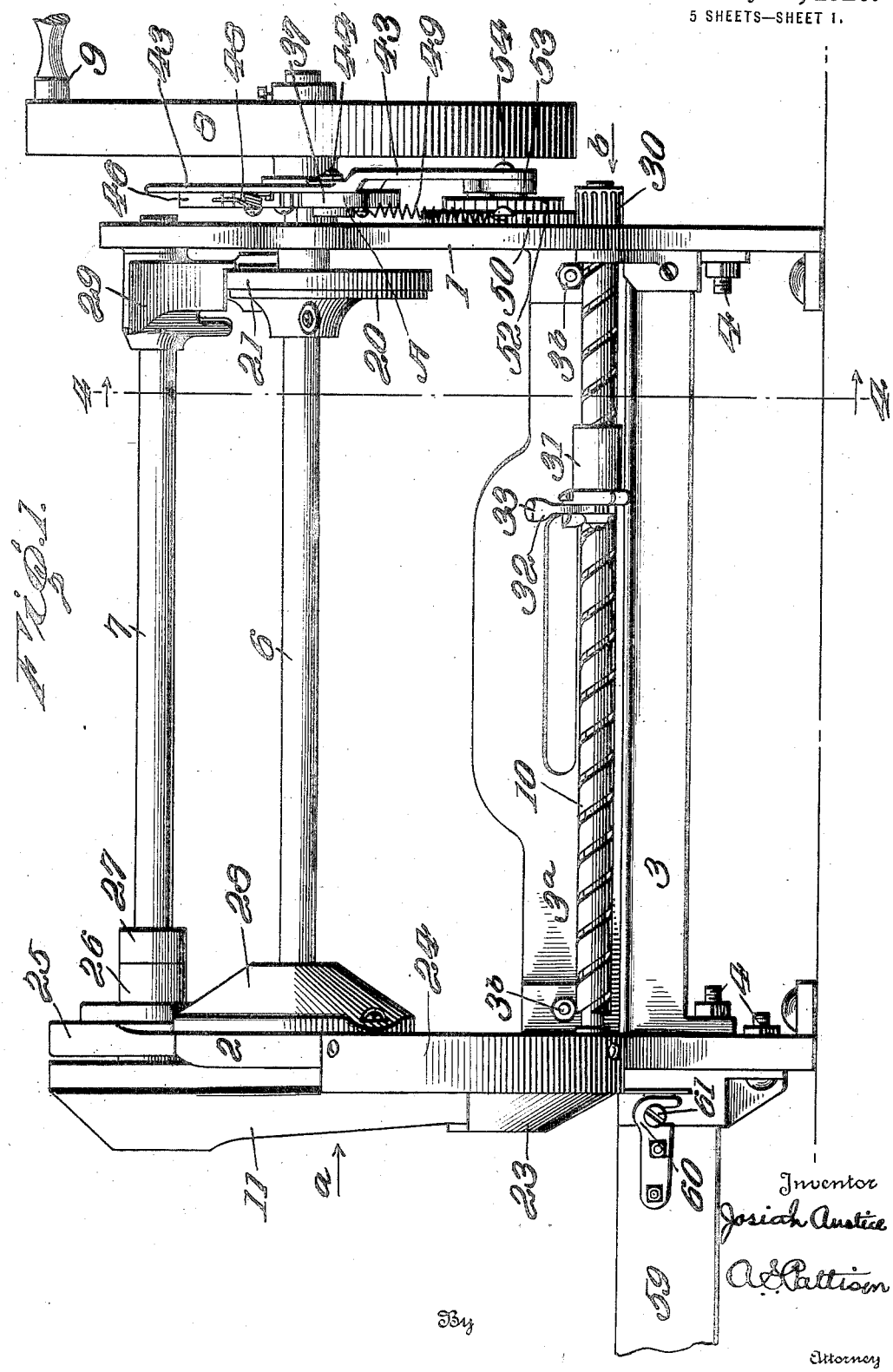
Figure 1 is a front side elevation of a combined bread slicer and stacker embodying my invention.

In carrying out my present improvement, a suitable frame is provided which consists essentially of two end pieces 1 and 2, and a bread receiving trough 3. This bread receiving trough 3 has its ends suitably clamped to the lower ends of the frames 1 and 2, by suitable bolts 4. The ends of the trough 3 are located at vertical openings 5 made in the front lower sides of the end frames 1 and 2, as clearly shown. This trough serves to hold the end frames in their proper relative positions.

A rotating drive shaft 6 extends longitudinally of the machine and has its end suitably journaled within the end frames 1 and 2. Located above the rotating shaft 6 is a rock shaft 7, which also has its ends suitably journaled in the said end frames 1 and 2. The drive shaft 6 has one end projecting outside of and beyond the end frame 1, sufficiently to receive an operating balance wheel 8, which carries a suitable handle 9 for rotating the balance wheel and thereby rotating the drive shaft 6, and to operate a reciprocating mechanism A, by means of which a screw-shaft 10 is intermittently rotated for feeding the bread forward step by step. The detailed construction of the reciprocating mechanism A, will be presently described.

As shown in Fig. 5, the rock shaft 7 projects outside of the end frame 2 and has attached thereto a cutter-blade carrying frame 11, the frame 11 projecting downward and carrying a cutter blade 12, journaled in the frame 11, upon a suitable stud or shaft 13. A collar 14 loosely rotates on the shaft 7 and the outer end of this collar carries a sprocket wheel 15, and the inner end of the collar carries a gear wheel 16. Passing around the sprocket wheel 15, is a sprocket chain 17, which also passes around a sprocket wheel 18 which is suitably attached to the cutter blade 12, whereby the rotation of the collar 14, causes the cutter blade to correspondingly rotate. A gear wheel 19 is attached to the drive shaft 6 and meshes with the gear 16 of the collar 14, for rotating the collar 14 and thereby the cutter blade through the sprocket wheels 15, and 18, and the sprocket chain 17.

For the purpose of rocking the shaft 7, an eccentric 20 is carried by the drive shaft 6, and an eccentric band 21 passes therearound and is pivotally connected with the lower end of the crank arm 22 at the point 23, the upper end of the crank arm being firmly attached to the rock shaft 7 in any suitable manner. From this construction it will be understood that the rotation of the drive shaft 6 causes a rocking motion to be imparted to the rock shaft 7, and this rocking motion is imparted to the blade carrying frame 11, so that its lower free end is caused to reciprocate back and forth across the outlet end of the bread-carrying trough 3, by the rotation of the drive shaft 6, while at the same time the cutter blade is given a continuous rotary movement. In this way the cutter blade has combined reciprocating and continuous rotary movements across the outlet end of the bread trough to cut slices from the projecting end of the bread (not shown) as it reciprocates and rotates across the trough 3.

The frame 11 is made in the form of a housing which incloses the gears 15, 18 and sprocket chain 17, and has its lower end 23' tapered inwardly and downwardly close to the outer face of the cutter blade 12. A vertically arranged housing 24 is carried by the outer front edge of the end frame 2, into which housing the outer rotating edge of the cutter blade passes when it is in its outward position. This housing 24 thus incloses the outer edge of the cutter blade for the purpose of protecting it against accidentally cutting the operator.

The end frame 2 has its top edge provided with a suitable housing 25, which incloses the gear 16, and this housing 25 being a part of the end frame 2, is provided with a suitable journal 26 for that end of the rock-shaft 7, and a suitable collar 27 carried by the rock shaft prevents it from having an outward endwise movement in the journal 26. For the purpose of inclosing the gear 19, a suitable housing 28 carried by the end frame 2, embraces the gear and prevents anything being caught therein as the machine is being operated.

As the machine is being operated, the eccentric 20 and its strap 21 come close to the rock shaft 7, and to prevent the operator accidentally having his finger caught between the cam 20 and shaft 7, a housing 29 is loosely journaled on the shaft 7, and projects from the cam and rides up and down with it, thus closing the space between the cam 20 and shaft 7.

Figure 4:
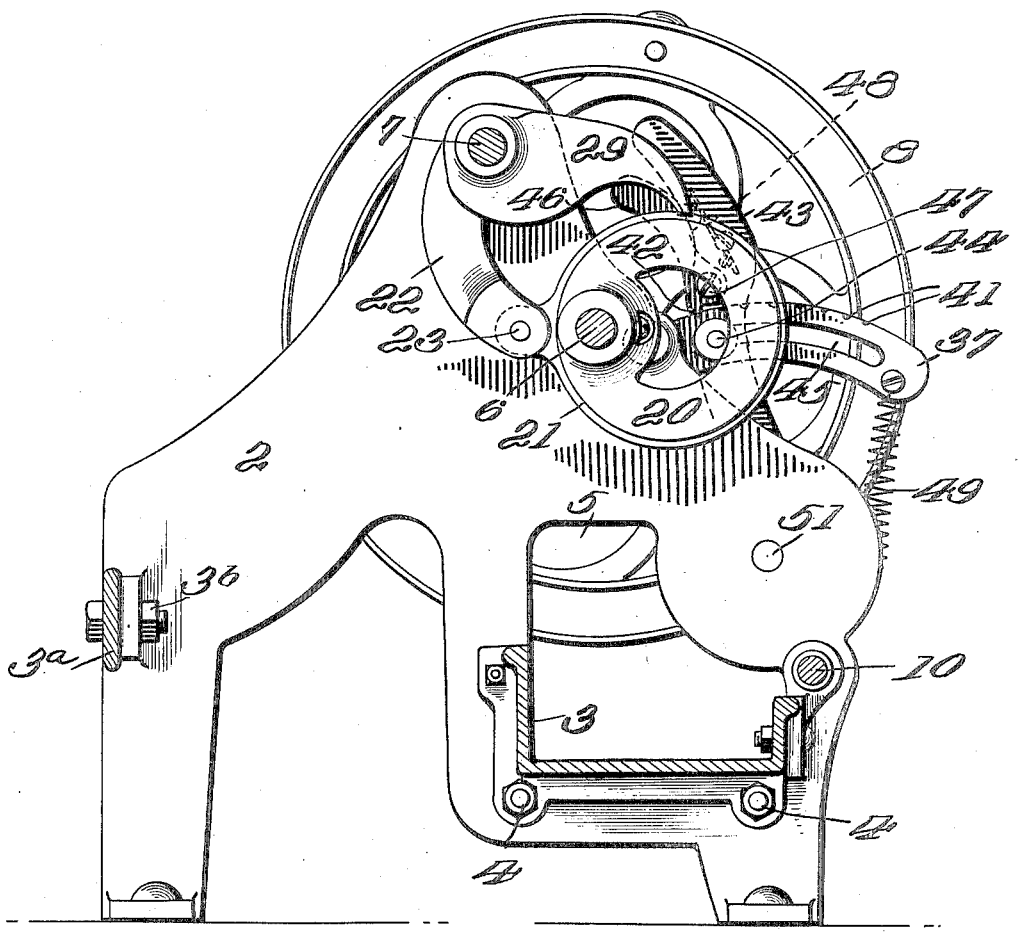
Fig. 4 is a vertical transverse sectional view on the line 4—4 of Fig. 1, looking in the direction indicated by arrow.

Turning now to the mechanism for feeding the bread forward a step at a time to be sliced, the screw-shaft 10, above referred to, extends longitudinal the machine and its trough 3, and is located slightly above and in a vertical plane outside of the trough 3, as shown in Fig. 4. The rear end of this screw-shaft 10 is provided with a pinion 30. A collar 31 loosely surrounds the screw-shaft 10, and this collar carries a member 32 pivoted thereto and carrying a projection adapted to engage the thread groove of the shaft 10. This member 32 is held normally in engagement with the thread of the shaft 10 by any suitable flat spring 32'. By depressing the end 33 of the member 32, it can be disengaged from the shaft 10 and moved to any desired position along the shaft for feeding the bread. This member 32 is pivoted to the collar 31 at the point 34. A pusher 35 extends from the collar 31 into and across the trough 3, for engaging the end of the bread and pushing it along in the trough to be sliced. Preferably the pusher 35 is provided with upwardly projecting prongs 36 for the purpose of entering the end of the bread and holding it in position as it is being pushed forward, to be sliced, and which enables the bread to be drawn backward in the trough 3 by moving the pusher backward in the trough.

Figure 3:
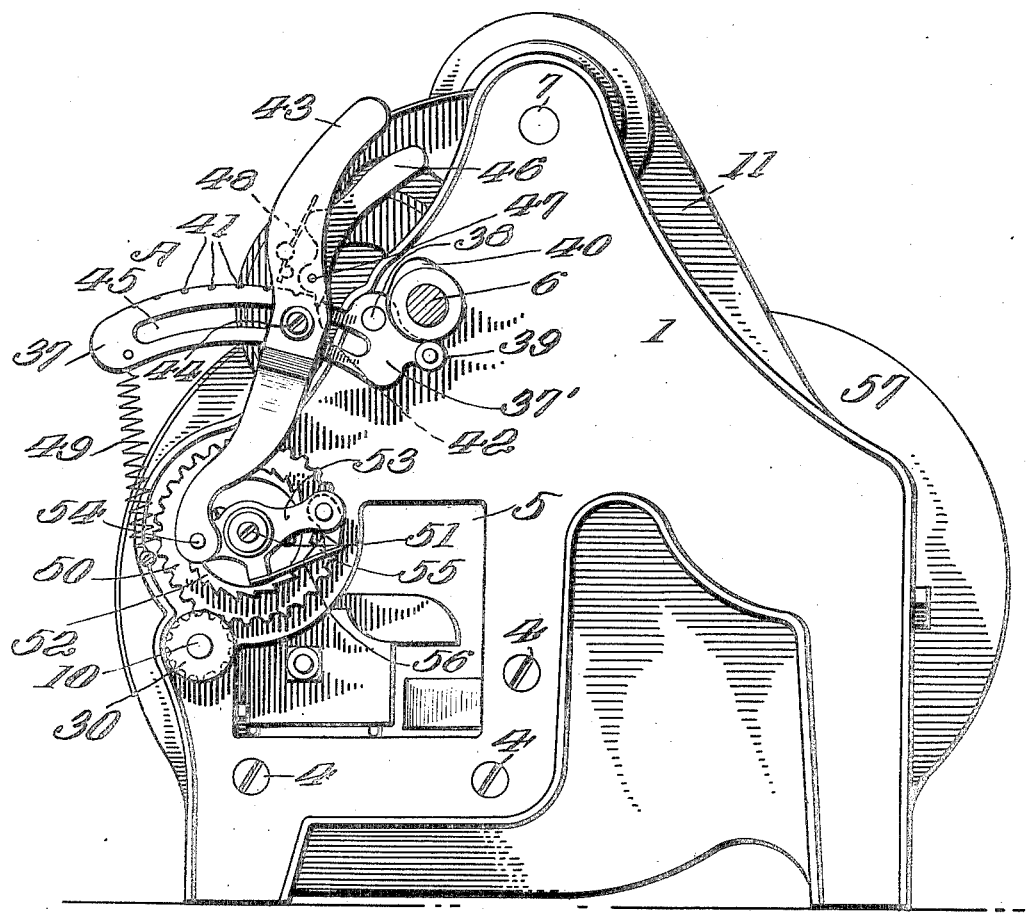
Fig. 3 is an end elevation of my improved machine looking in the direction indicated by arrow *b* of Fig. 1.

This pusher is moved intermittently forward a predetermined variable distance by rotating the screw-shaft intermittently and variable degrees of rotation. This is accomplished by feeding mechanism A, before referred to. This feeding mechanism A comprises a pivoted slotted arm 37, pivoted at the point 38 to the end frame 1. The short end of this lever 37 carries a roller 39 which is engaged by a cam 40 carried by the drive shaft 6, as the latter is rotated. The upper edge of the slotted lever 37 is provided with notches 41, with which a lug 42 is adapted to engage as the lever 43 is moved back and forth on the slotted lever 37. This lever 43 is provided with an intermediate pivot 44, which passes loosely through the slot 45 of the lever 37. By this construction the lever 43 may be moved back and forth on the slotted lever 37. The lug 42 is carried by a lever 46, which is pivoted at 47 to the lever 43, and a spring 48 serves to hold the lug 42 normally in engagement with any desired notch 41 of the lever 37. In this manner the lever 43 is adjustable to any desired point on the slotted lever 37. A helical spring 49 has one end connected with the free end of the slotted lever 37, and its other end connected to the end frame 2, as shown in Fig. 3, and this spring serves to pull the outer end of the slotted lever 37 down after it has been moved up by the cam 40. A gear wheel 50 is journaled on a suitable short shaft 51 projecting outward from the end frame 1. This gear wheel 50 carries a ratchet wheel 52. Intermediately pivoted on the shaft 51 is a lever 53, which has its outer end pivoted at the point 54 to the lever 43. The opposite inner end of the lever 53 carries a pivoted latch 55, which is normally held in contact with the ratchet wheel 52 by a flat spring 56.

From this construction, it will be understood that the upward movement of the slotted lever 37 pulls up on the lever 43 and in turn pushes the latch 55 downward rotating the ratchet wheel 52 and the gear wheel 50, thereby rotating the shaft 10 through the pinion 30. The distance that the shaft 10 is rotated is regulated by the position of the lever 43 on the slotted lever 37. By adjusting the lever 43 outward on the lever 37, the rotary movement of the ratchet wheel 52 is increased, thereby increasing the rotary movement of the shaft 10, and in turn increasing step by step the movement of the bread-pusher 35. Likewise the movement of the bread pusher may be reduced by adjusting the lever 43 inward on the slotted lever 37.

Figure 2:
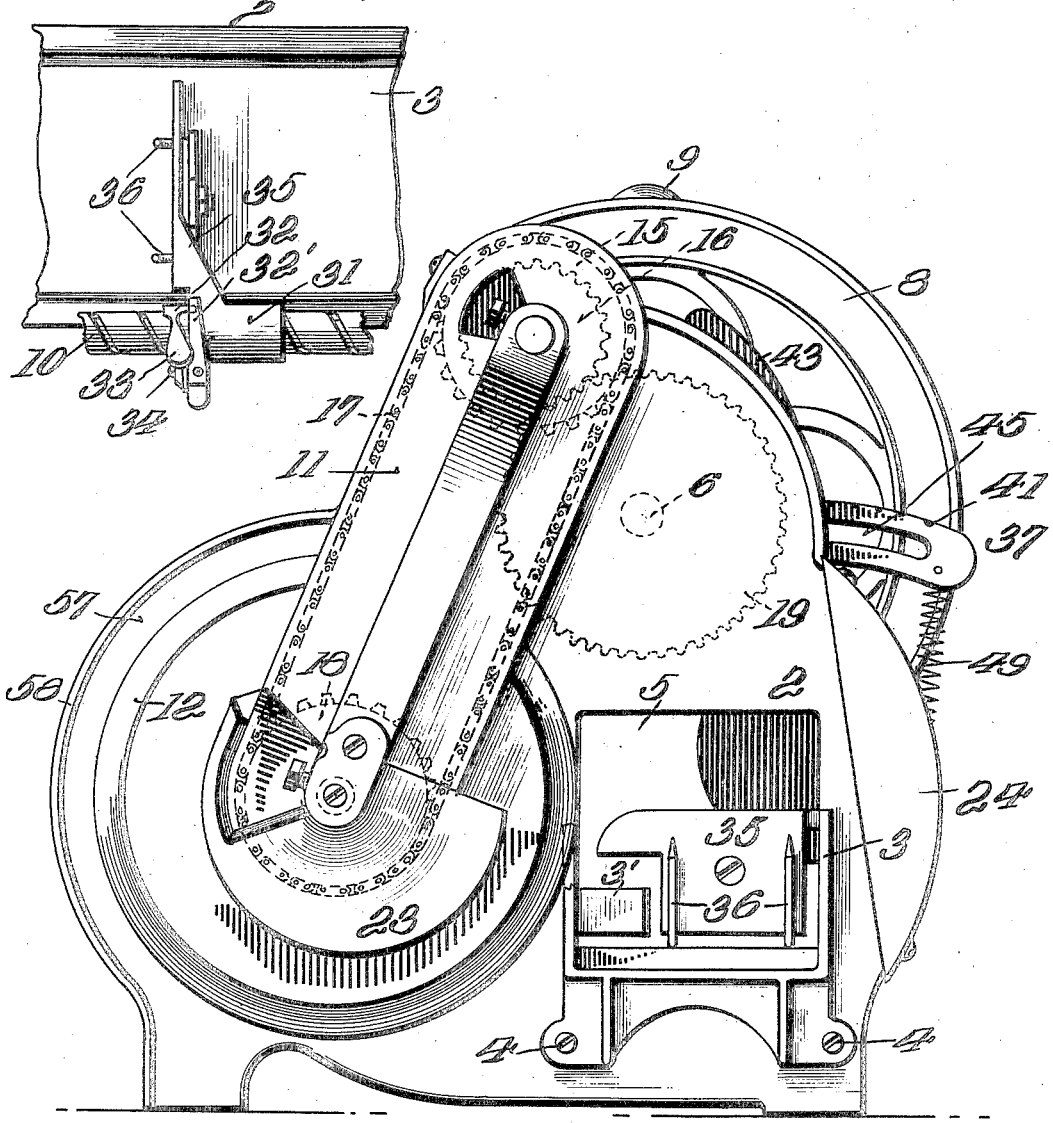
Fig. 2 is an end elevation looking in the direction indicated by arrow *a*, Fig. 1.

The relative positions of the cam 40 and the eccentric 20 on the drive shaft 6 are such that the bread pusher is actuated forward when the cutter blade 12 is out of line with the end of the bread trough, as shown in Fig. 2, and the pusher is stationary while the rotating blade 12 is being reciprocated across the end of the trough 3 to cut the projecting end of the bread.

The end frame 2 has its rear side curved outward, as shown at 57, and the edge of this curved portion is preferably provided with an outwardly projecting flange 58. By means of this construction no part of the cutting edge of the rotating blade 12 projects at any time beyond the protecting frame of the machine.

The stacking arrangement of my improvement comprises an open stacking trough 59, which has its inner end provided with hooks 60, adapted to engage projecting screws or lugs 61 on the outer end of the trough 3, and to be attachably and detachably connected therewith. The cut slices of the bread will be stacked in this stacking trough 59, and it will be made of any desired length.

While I have constructed my slicing machine as particularly adapted for slicing bread, I desire it to be understood that it could be used for slicing other objects or substances by changing the shape of the trough to suit the particular thing to be sliced, and I do not, therefore, limit the broad invention here disclosed to its use for slicing bread.

Having thus described my invention, what I claim and desire to secure by Letters Patent is:—

1. A slicing machine comprising a feed trough, a rock shaft, a drive shaft, a cutter frame connected with and rocked by the rock shaft, a revoluble cutter blade carried by the free end of the cutter frame, the drive shaft operatively connected with and revolving the cutter blade, an eccentric on the drive shaft, the rock shaft carrying a crank arm, an eccentric band pivotally connected with the said crank arm whereby the rock shaft is rocked simultaneously with the revolving of the cutter blade, for the purpose described.

2. A slicing machine comprising a feed trough, a rock shaft, a cutter frame connected with and rocked by the rock shaft, a cutter blade carried by the free end of the cutter frame, a drive shaft operatively connected with and revolving the cutter blade, a pusher within the trough, intermittently movable mechanism operatively connected with the pusher, a cam carried by the drive shaft and actuating the intermittent mechanism, an eccentric on the drive shaft, an eccentric band, a crank arm connected with the rock shaft and pivotally connected with the eccentric band, the said cam and eccentric being so positioned on the drive shaft that the pusher is moved when the cutter frame is out of line with the feed trough and is quiescent as the cutter frame moves across the feed trough.

3. In a slicing machine, a frame comprising parallel separated vertical standards, a trough between and having its ends connected to and holding the standards in proper relative positions, a rock shaft extending from standard to standard and having its ends pivotally supported in the upper ends thereof, the rock shaft extending through and projecting beyond one of the standards, a knife frame having its upper end connected to the projecting end of the rock shaft with its free end extending down parallel with the outer side of the said standard, the standard adjacent the knife frame having an opening registering with the adjacent end of the trough and of a size corresponding to the cross-section of the trough, a revoluble knife mounted in the lower end of the knife frame, an operating shaft extending parallel the rock shaft and having its ends journaled in said standards, that end of the operating shaft adjacent the knife frame carrying a gear, a gearing between said gear and the knife for rotating the latter, and a reciprocating connection between the operating shaft and the rock shaft for rocking the latter and swinging the free end of the knife frame and knife across the trough opening in the adjacent standard.

4 A slicing machine comprising vertically separated parallel standards, a trough between the standards, a rock shaft supported in the upper ends of the standards, an operating shaft supported in the standard below the rock shaft, one end of the rock-shaft projecting through one of the standards, a knife frame having its upper end connected with the projecting end of the rock shaft, and its lower end adapted to swing across the adjacent end of the trough, a revoluble knife carried by the lower end of the knife-frame, an operative gearing between the revoluble knife and the adjacent end of the operating shaft, the opposite end of the operating shaft operatively connected with the adjacent end of the rock-shaft to rock the latter, the end of the operating shaft removed from its gear projecting through the adjacent standard, and an operating wheel connected to the projecting end of the operating shaft.

5. In a construction such as described in claim 8, characterized by having a gear housing located at the inner side of the standard adjacent the gear of the operating shaft and inclosing the gear.

6. In a construction such as described in claim 8, characterized by having the outer side of the upper end of the standard provided with a gear recess opposite the upper end of the knife frame and coöperating therewith to inclose the gears on the rock-shaft, and a housing at the inner side of the standard below the said recess and inclosing the gear on the operating shaft.

7. A pusher mechanism for a slicer of the character described, comprising a screw-shaft extending parallel the trough, a pusher in the trough and moved by the screw-shaft, a ratchet wheel operatively connected with the screw-shaft, a cam on the operating shaft, an intermediately pivoted lever having one end operated by the cam and its opposite end provided with an elongated slot, a ratchet lever for operating the ratchet wheel, a lever having one end pivoted to the ratchet lever and its opposite end pivotally supported within the elongated slot of the aforesaid intermediately operated lever, and projecting beyond the slotted lever to form a handle, the slotted lever having notches and a handle carrying a spring catch for engaging the notches of the slotted lever, whereby the handle lever may be adjusted on the slotted lever, for the purpose described.

8. A slicer of the character described, comprising an operating shaft, a rock-shaft, a knife frame having one end directly connected with the rock shaft, a revolving knife carried by the other and free end of the knife frame, a gearing connection between the drive shaft and the revolving knife, and a rocking connection between the drive-shaft and the rock-shaft for rocking the rock shaft and therewith the knife frame.

9. A slicer of the character described, comprising parallel drive and rock shafts, a knife frame having its upper end directly connected with the rock-shaft to be rocked thereby, a revolving knife carried by the lower end of the knife frame, a gearing connection between the drive-shaft and the revolving knife, and a rocking connection between the drive-shaft and the rock-shaft, the parts operating as described.

In testimony whereof I hereunto affix my signature.

JOSIAH ANSTICE.